Dec. 24, 1957  L. V. WESTBROOK  2,817,758
CONTROL APPARATUS
Filed Nov. 8, 1954

INVENTOR.
Lowell V. Westbrook
BY Carlson, Pitzner, Hubbard & Wolfe
ATTORNEYS

United States Patent Office 2,817,758
Patented Dec. 24, 1957

2,817,758

CONTROL APPARATUS

Lowell V. Westbrook, Roscoe, Ill., assignor to Barber-Colman Company, Rockford, Ill., a corporation of Illinois Application November 8, 1954, Serial No. 467,389

5 Claims. (Cl. 250—27)

This invention relates to electronic apparatus adapted to detect the presence of a rectifying impedance and distinguish the same from other types of impedance between two conductors and including a tube which normally is maintained in a non-conductive state by a cut-off bias source of alternating voltage but is rendered conductive in response to charging of a grid control capacitor when a rectifying impedance is present. More particularly, the invention relates to flame detection apparatus in which a rectifying impedance is produced between the conductors when a flame is present and in which the alternating plate supply voltage of the tube is utilized in a circuit including the conductors and the capacitor for charging the latter to render the tube conductive when a flame is present.

One object of the invention is to arrange the grid control capacitor and the cut-off voltage source in the bias control circuits of the tube in a novel manner to enable the voltage in the capacitor charging circuit and therefore the sensitivity of the apparatus to be increased without reducing the effectiveness of the cut-off voltage in maintaining the tube non-conductive when impedance between the conductors is bilaterally conductive rather than rectifying.

Another object is to locate the grid control capacitor in the bias control circuits in a novel manner in relation to the cut-off voltage to provide safe operation and insure that the tube remains non-conductive under both conditions of a short circuit or an open circuit of the capacitor.

A more detailed object is to connect the capacitor between the grid and the cathode of the tube in a circuit separate from the cut-off voltage source thereby enabling the latter to remain effective to cut-off the tube when an open circuit develops at the capacitor.

Other objects and advantages of the invention will become apparent from the following detailed description taken in connection with the accompanying drawings, in which.

Figure 1:
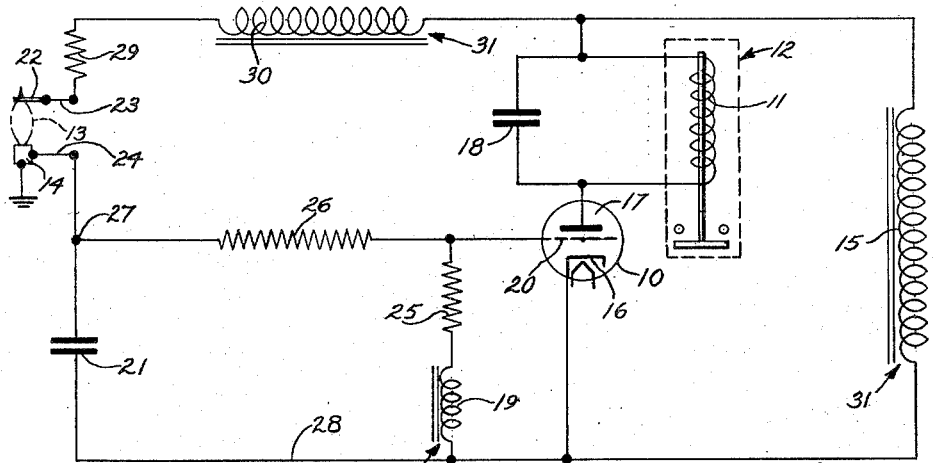
Figure 1 is a schematic wiring diagram of control apparatus embodying the novel features of the present invention.

In the drawings, the invention is shown for purposes of illustration embodied in electronic apparatus having a triode 10 for energizing the coil 11 of a relay 12 when a flame 13 is present at a burner 14 and maintaining the relay deenergized when no flame is present. The relay coil is connected in the triode load circuit which comprises a source 15 of alternating voltage having one terminal connected to the cathode 16 of the tube and its other terminal connected to the anode 17 through the relay coil 11. A capacitor 18 connected in parallel with the relay coil is charged during conduction by the tube in alternate half cycles of the source and discharges through the relay coil to maintain the same energized during intervening half cycles when the potential of the anode is negative relative to the cathode.

Figure 2:
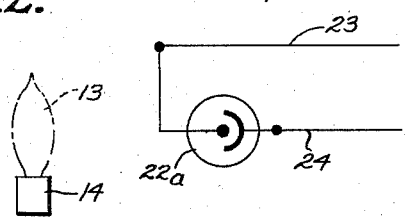
Fig. 2 is a schematic view of an alternative means for producing a rectifying impedance.
Figure 3:
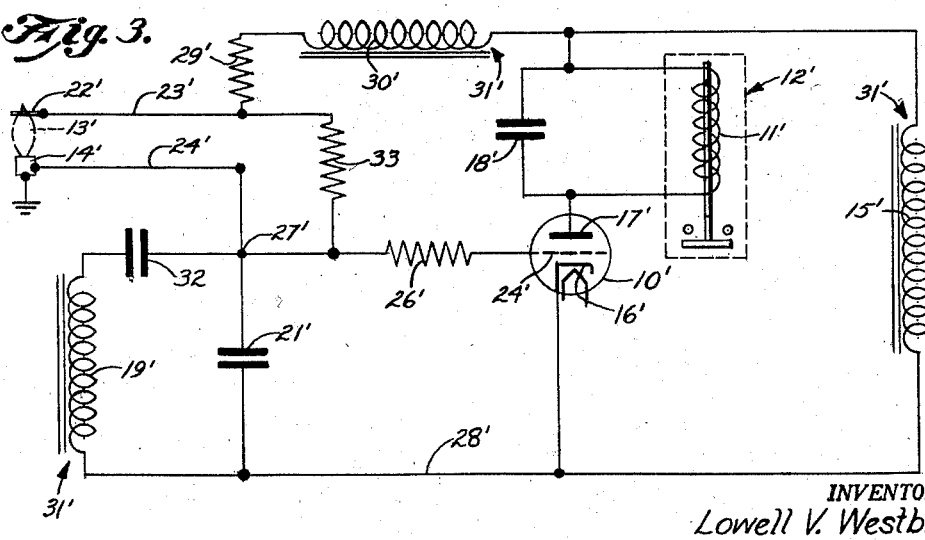
Fig. 3 is a wiring diagram of modified control apparatus.

The tube 10 normally is maintained in a non-conductive state by a source 19 of alternating bias voltage connected between the cathode 16 and the grid 20 of the tube and operable to apply to the grid an alternating potential of a phase opposite to that of the anode 17. This cut-off potential is overcome for conduction by the tube and energization of the relay coil 11 when a control capacitor 21, also connected between the grid and the cathode, becomes charged with its grid side positive. To charge the capacitor and render the tube conductive in response to a flame, the capacitor is connected in a series charging circuit including the plate voltage source 15 and means including the flame for producing a rectifying impedance when the flame is present. This means may comprise two electrodes such as the burner 14 and a flame rod 22 spaced apart in the path of the flame 13 and cooperating with the latter to form the rectifying impedance when the flame contacts both electrodes as shown in Figs. 1 and 3. In this arrangement, the burner and the flame electrode 22 are connected into the capacitor charging circuit by conductors 23 and 24 and the impedance to current flow from the flame electrode to the burner is less than in the opposite direction to provide the rectifying effect. An alternative means for producing a rectifying impedance when a flame is present may include a photoconductive cell with rectifying properties, for example, a photoelectric vacuum tube 22a which acts as a rectifier when light from a flame impinges on its cathode and whose anode and cathode may be connected to the conductors 23 and 24 in the capacitor charging circuit as shown in Fig. 2.

In the use of flame detection apparatus of the above character, it is hazardous to give a false indication of a flame by actuation of the relay 12 when any of the circuit elements such as the capacitor 21 is open-circuited or short-circuited or when the gap between the burner 14 and the flame electrode 22 is open or is short-circuited by a bilaterally conductive impedance, that is, one which conducts substantially equally in both directions. Another hazardous condition is faulty operation of the relay by external capacitance such as that distributed between the conductors 23 and 24 connecting the burner 14 and the flame electrode 22 to the detection apparatus. Also, in the use of such apparatus, it is desirable to insure operation of the relay even when the gap between the burner and the flame electrode is bridged by a flame having a low rectification ratio of impedance in the direction of flame propagation to impedance in the opposite direction.

To avoid the hazardous conditions referred to above while providing sensitive apparatus which responds to flames having low rectification ratios, the present invention contemplates controlling the bias of the grid 20 relative to the cathode 16 in a novel manner such that the voltage in the capacitor charging circuit may be varied to make the apparatus sensitive without reducing the effectiveness of the bias source 19 in suppressing conduction by the tube. This is accomplished by connecting the control capacitor 21 and the bias source 19 in parallel circuits between the grid and the cathode thereby, in effect, isolating the bias voltage source from the capacitor charging circuit.

In the preferred control shown in Fig. 1, the cut-off bias circuit through the bias source 19 and between the grid 20 and the cathode 16 is completed by a series current limiting resistor 25. The parallel circuit through the control capacitor 21 is completed by a second current limiting resistor 26 connected in series between the grid and a junction 27 on the grid side of the capacitor, the other side of the capacitor being connected directly to the cathode by a conductor 28. In the control capacitor charging circuit, the burner 14, which is grounded, is connected by the conductor 24 to the junction 27 between the capacitor 21 and the second current limiting resistor 26 and the flame electrode 22 is connected to the anode side of the load circuit source 15 through the conductor 23 and a third resistor 29 whose functions will be described below.

To take advantage of the substantial isolation of the bias voltage source 19 from the capacitor charging circuit, the latter is completed by a third voltage source 30 which is connected in series with the flame gap and the resistor 29 between the junction 27 and the load circuit source 15 and is in phase with the latter to increase the total voltage available for charging the capacitor. Such location of this source between the grid and the anode makes it possible to increase the voltage for charging the capacitor without applying excessive voltage to the anode thereby endangering the life of the tube.

In the operation of the preferred control of Fig. 1, let it be assumed that no flame is present and an open circuit exists between the flame and burner electrodes 22 and 14 and that all circuit components are functioning properly. The potential of the grid 20 relative to the cathode 16 under these conditions is that applied by the bias source 19 and its value is determined by control capacitor 21 and the resistors 25 and 26 which constitute a voltage divider. With this potential, the grid is negative when the anode 17 is positive thereby rendering the tube 10 sufficiently nonconductive that the relay 12 is not actuated. Should an open circuit or a short circuit develop at the control capacitor 21, the cut-off potential still is applied to the grid to maintain the tube in a nonconductive state. This is due to connection of the bias source directly between the cathode and the grid side of the grid resistor 26.

When the flame gap is bridged by a bilaterally conductive impedance, the sum of the alternating voltages of the load source 15 and the auxiliary charging source 30 is applied in series with the control capacitor 21 and, acting between the grid 20 and the cathode 16, tends to drive the grid positive when the anode 17 is positive. The tube is maintained in a nonconductive state, however, because the potential applied between the grid and the cathode actually is a portion of that appearing across the control capacitor 21 and this voltage, due to inclusion of the third resistor 29 in series in the charging circuit, is sufficiently out of phase with the anode potential that it is ineffectual to overcome the cut-off potential applied to the grid by the bias source 19.

To provide such a phase shift in the voltage appearing across the capacitor 21 and insure safe operation with no actuation of the relay 12 whether the bilateral impedance bridging the flame gap is low as might occur when the flame electrode 22 contacts the burner 14 or is high as when carbon deposits bridge the electrodes, the value of the resistor 29 is made substantially higher than the impedance of the control capacitor. The value of the resistor 29 also is correlated with the impedance values of the flame 13 and is kept low enough to avoid decreasing the sensitivity of the apparatus by decreasing the charging voltage of the control capacitor while still providing the desired phase shift of the capacitor voltage. Another function of the resistor 29 is to limit current flow in the capacitor charging circuit to a safe value in the event that the operator makes bodily contact between the flame electrode 22 and ground.

By selecting the proper value of the resistor 29, the tube 10 also is maintained in a cut-off condition when the electrodes 14 and 22 are bridged by a capacitance such as the distributed capacitance between the conductors 23 and 24. When a large capacitance appears between the conductors, the voltage of the control capacitor 21 still lags behind that of the anode far enough to maintain the tube cut off. A smaller value of capacitance across the electrodes results in little phase shift of the control capacitor voltage, but the value of the latter voltage is too small to overcome the negative bias of the source 19, the low value of distributed capacitance providing a large voltage drop.

When the electrodes 14 and 22 are bridged by the flame 13, more current will flow from the flame electrode to the burner during half cycles of the charging sources 15 and 30 when the flame electrode is positive relative to the burner than will flow in the opposite direction during the intervening half cycles. A positive charge then builds up on the grid side of the control capacitor 21 because the value of the resistor 26 which is in the primary discharge circuit of the capacitor between the cathode 16 and the grid 20 is large enough to prevent dissipation of this positive charge when the burner is positive relative to the flame electrode. After several cycles of the charging voltages, the capacitor charge is sufficient to overcome the negative bias of the source 19 and the tube 10 conducts to actuate the relay 12. The tube continues to conduct as long as a flame bridges the flame gap.

As soon as the flame is extinguished, the control capacitor 21 begins to lose its charge through the primary discharge circuit including the resistor 26. After a short interval determined by the time constant of this circuit, the tube again is cut off by the negative bias of the source 19 and the relay drops out, this interval being sufficiently long to avoid drop out of the relay due to flickering of the flame.

Values of the various circuit components found suitable to provide the desired operation in one embodiment of the invention include .1 of a microfarad for the control capacitor 21 and 820,000 ohms for the resistor 29 in the capacitor charging circuit. Each of the sources 15, 19, and 30 in such control may be the secondary of a transformer 31 whose primary (not shown) is connected to a suitable primary source of power, the voltage of the load source 15 being 184 volts and the values of the bias source 19 and the auxiliary charging source 30 being respectively 106 volts and 178 volts, R. M. S. at 60 cycles per second. The values of the resistors 26 and 25 are 8.2 megohms and 33 megohms respectively. While the tube 10 may be a multiple grid vacuum tube or a thyratron, one tube found satisfactory is a double triode vacuum tube of the 6BL7 type having its electrodes paralleled to constitute, in effect, a single triode.

Another arrangement of the control capacitor 21 and the bias source 19 providing isolation of the latter from the capacitor charging circuit is shown in Fig. 3, the parts of the modified circuit which correspond to parts of the preferred control bearing similar but primed reference characters. In the modified detection apparatus, the control capacitor 21' is connected directly between the junction 27' and the cathode 16' and in series with the resistor 26' between the grid 20' and the cathode 16' as in the preferred apparatus described above. The negative bias circuit, however, instead of extending between the cathode and the grid side of the grid resistor 26', extends between the cathode and the junction 27' at the other terminal of the grid resistor 26'. To complete the negative bias circuit, a second capacitor 32 is connected in series with the bias source in place of the resistor 25. An additional resistor 33 also is connected across the conductors 23' and 24' and in shunt with the gap between the electrodes 14' and 22' to provide a direct current path between the cathode and the grid through the voltage sources 15' and 30' to stabilize the tube 10' and prevent floating of the grid 20'.

In one embodiment of the modified apparatus using a 6BL7 tube, satisfactory operation was achieved with the values of the series charging resistor 29′, the load voltage source 15′, and the control capacitor 21′ the same as those of the corresponding parts of the preferred apparatus. The values of the auxiliary charging source 30′ and the bias source 19′, however, of the modified apparatus are 106 volts and 178 volts respectively, the capacitance of the second capacitor 32 being .01 of a microfarad and the values of the shunting resistor 33 and the grid resistor 26′ respectively being 50 megohms and 4.7 megohms.

The operation of the modified control is substantially the same as that of the preferred control, the voltage of the bias source 19′ being applied between the grid 20′ and the cathode 16′ through a voltage divider constituted by the two capacitors 21′ and 32 to maintain the grid at the alternating potential which appears at the adjacent side of the control capacitor and is opposite in phase compared to that of the anode potential when the condition of an open circuit at the electrodes 14′ and 22′. When the flame 13′ bridges the latter, the control capacitor 21′ is charged with its grid side positive due to rectification by the flame, and the tube 10′ conducts for actuation of the relay 12′. Under unsafe conditions such as short circuiting of the electrodes 14′ and 22′ by a bilaterally conductive capacitive or resistive impedance, the voltage of the sources 15′ and 30′ appearing across the control capacitor either is displaced in phase from the anode potential far enough or is sufficiently small that the cut-off potential of the bias source 19′ remains effective to limit current flow through the tube to a value insufficient to actuate the relay 12.

In both forms of the invention discussed above, the bias voltage of the source 19 acts independently of the voltages of the sources 15 and 30 in the capacitor charging circuit to maintain the tube 10 non-conductive under no-flame conditions while permitting variation of the charging voltage to obtain actuation of the relay 12 when the rectification ratio of the flame is low and in spite of stray capacitance in the leads 23 and 24 to the electrodes. Such sensitivity is made possible without endangering the life of the tube by virtue of the location of the auxiliary charging source 30 between the grid and the cathode of the tube instead of in the load circuit. Another advantage of connecting the control capacitor 21 in a shunt around the bias source 19 is that the tube 10 remains non-conductive and therefore fails safe when an open circuit develops at the control capacitor. The preferred form also fails safe when the control capacitor is short-circuited by virtue of the connection of the bias source 19 directly between the grid and the cathode instead of through the grid resistor 26.

I claim as my invention:

1. The combination of, an electron tube having an anode, a cathode, and a control grid, a first source of alternating potential having one terminal connected to said cathode and the other terminal connected to said anode through a load device, a grid current limiting resistor connected in series with said grid, a cut-off bias circuit comprising a second resistor and a second source of alternating voltage connected between said cathode and the grid side of said resistor to apply to said grid an alternating potential out of phase with the potential of said anode, a pair of conductors defining a gap adapted to be bridged by a rectifying impedance, a capacitor connected between the other terminal of said current limiting resistor and said cathode in a circuit shunting said bias source, and a circuit for charging said capacitor with the grid side thereof positive to overcome the cut-off bias of said second source to render the tube conductive, said charging circuit including a resistor connected in series with said gap between said grid side of said capacitor and said other terminal of said first source.

2. The combination of, an electron tube having a anode, a cathode, and a control grid, a first source of alternating voltage having one terminal connected to said cathode and its other terminal connected to said anode through a load device, a current limiting resistor connected in series with said grid, a second source of potential connected in series with a first capacitor between said cathode and the terminal of said resistor remote from said grid for applying to the latter an alternating cut-off potential out of phase with the potential of said anode, a second capacitor connected between said cathode and said remote resistor terminal in a circuit shunting said second source, a pair of conductors defining a gap adapted to be bridged by a rectifying impedance, and a resistor connected in series with said gap between said remote resistor terminal and said other terminal of said first source to complete a circuit through the latter and the gap for charging the capacitor with its grid side positive to overcome the bias of said second source and render said tube conductive when the gap is bridged by a rectifying impedance of proper polarity.

3. The combination of, an electron tube having an anode, a cathode, and a control grid, a first source of alternating voltage having one terminal connected to said cathode and the other terminal connected to said anode through a load device, a source of bias potential connected between said cathode and said grid for applying to the latter an alternating potential out of phase with the anode potential, a capacitor connected in series with a current limiting resistor between said grid and said cathode and shunting said bias source, a pair of conductors defining a gap adapted to be bridged by a rectifying impedance, a second current limiting resistor, and a third source of alternating potential connected in series with said second resistor and said gap between the grid side of said capacitor and said other terminal of said first source and cooperating with the latter to charge the grid side of the capacitor positive for conduction by said tube and actuation of said load device when the gap is bridged by a rectifying impedance of the proper polarity.

4. The combination of, an electron tube having an anode, a cathode, and a control grid, a load circuit comprising a first source of alternating potential having one terminal connected to said cathode and the other terminal connected through a load device to said anode, a bias source of alternating potential connected in a circuit between said grid and said cathode for applying to the grid a cut-off potential out of phase with the potential of said anode, a pair of conductors defining a gap adapted to be bridged by a rectifying impedance, a junction, a current limiting resistor connected between said grid and said junction, a grid control capacitor connected between said junction and said cathode and shunting said bias source in a circuit between said grid and said cathode, and a second resistor connected in series with said gap between said junction and said other terminal of said first source to complete a circuit through the latter and said capacitor for charging the latter with the grid side thereof positive for rendering said tube conductive when the gap is bridged by said impedance.

5. The combination of, an electron tube having an anode, a cathode, and a control grid, a load circuit comprising a first source of alternating voltage having one terminal connected to said cathode and its other terminal connected to said anode through a load device, a cut-off circuit including a bias source of alternating voltage connected between said cathode and said grid and having a potential on the grid terminal thereof out of phase with the potential of said anode for maintaining current flow in said load circuit at a low value insufficient to actuate said load device, a pair of conductors defining a gap adapted to be bridged by a rectifying impedance, a grid control capacitor connected in a circuit shunting said bias source and extending between said grid and said cathode, and a charging circuit including a resistor connected in series with said gap between the grid side of said capacitor and the other terminal of said first source and operable, when the gap is bridged by a rectifying impedance, to charge the capacitor with the grid side thereof sufficiently positive to overcome said bias source and render said tube conductive for actuation of said load device.

References Cited in the file of this patent

UNITED STATES PATENTS

| | | |
|---|---|---|
| 2,243,071 | Crago | May 27, 1941 |
| 2,416,781 | Thomson | Mar. 4, 1947 |
| 2,640,920 | Cairns | June 2, 1953 |